Patented Dec. 14, 1948

2,456,295

UNITED STATES PATENT OFFICE 2,456,295

COATING COMPOSITIONS

William C. Mast, Philadelphia, Pa., assignor to the United States of America as represented by the Secretary of Agriculture No Drawing. Application June 22, 1944, Serial No. 541,559

6 Claims. (Cl. 260—8)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to polymerized resin emulsions or dispersions of the type used for coating compositions and the like, the purpose of the invention in general being to control the viscosities of the emulsions in a new and improved manner.

In prior art practices, it has been possible to control the viscosities of such emulsions to a certain extent by adding so-called "thickener." An objection to this is that the quantities of thickeners needed to produce a comprehensive coverage of viscosities is too large for practical purposes, and introduces into the coatings large amounts of water-sensitive ingredients which reduce the usefulness of the material for certain purposes. Methyl cellulose and various other materials may be used as thickeners with partial success under certain conditions, but several disadvantages attend their use. For example, methyl cellulose cannot be added prior to the polymerization because its solutions are coagulated by the temperatures required in polymerizing. Moreover, methyl cellulose is moderately soluble in cold water, and therefore films containing it have decreased water resistance.

This invention has among its objects a process for producing polymerized resin emulsions or dispersions the viscosities of which are controllable within wide limits independently of the resin content, thereby to obtain emulsions suitable for coatings, yet requiring low resin content and having high viscosity, or to obtain emulsions of high resin content with sufficient viscosity to give a heavy coating with one application; the production of improved polymerized resin emulsions or dispersions; and such other objects as will appear hereinafter.

In practicing the invention in general, in addition to the emulsified agents conventionally employed in polymerized emulsions, two other agents are mixed into the emulsion. One of these agents is casein dispersed with ammonia, sodium hydroxide or other basic materials, and preferably treated with borax, calcium chloride or other materials to decrease the action of water on the dried film produced from the emulsion. The other agent is a water-soluble alginate. Either of these agents, when used without the other, results in emulsions having lower viscosity than if both are used, and the increase in viscosity due to their combined use is greater than expected from their additive effects. The amount of each agent employed affects the properties of the emulsion sharply, and is chosen to conform to the final resin content, desired viscosity and the quantity of other ingredients present. Of the two agents mentioned, the effect on the viscosity by increasing the amount of the alginate is greater than that obtained by increasing the amount of casein. The effect is, however, widely varied depending upon the amount of each agent used.

These effects usually do not become apparent prior to polymerization of the emulsion, but are very pronounced during the polymerization and thereafter.

Although the manner of preparing the emulsions for polymerization may be varied, a simple and preferred manner is by preparing an aqueous solution of the water-soluble ingredients, adding the monomer or monomer mixture, containing any oil-soluble ingredients thereto, and agitating the mixture in a vessel to be used for subsequent polymerization. When high-boiling monomers are used, it is convenient to employ a vessel fitted with a stirrer, reflux condenser, thermometer well and suitable means for heating and cooling. Low-boiling monomers are preferably added under pressure or with cooling, after the other ingredients have been charged into a suitable closed vessel for polymerization.

Polymerization may be carried out by any of the means commonly employed for this purpose, such as by subjecting the mixture to light and/or heat, by treating the mixture with polymerizing catalysts, such as organic peroxides like hydrogen peroxide, inorganic peroxide like benzoyl peroxide, persulphates like potassium or ammonium persulphate, perborates like sodium perborate, and so forth. Polymerization regulators may be employed, if desired, to control the reaction or to avoid refluxing large amounts of the monomer.

In this manner, emulsions of great fineness may be produced in the polymerized form without beating or stirring other than that used during the polymerization, and compositions eminently suited for spraying, brushing, spreading or calendering, without running or sagging, are obtained.

The properties of the film deposited from the polymerized emulsion will depend largely upon the particular polymer dispersed in the emulsion. The examples given below illustrate the effect that different amounts of the agents employed have on the viscosity, independent of the resin content. While the films deposited from the emulsions produced according to the examples are smooth, tough, elastic, strong and water- and oil-resistant, the particular emulsions given are not suitable for all purposes.

By changing the monomers employed, many different types of coatings may be produced, and suitable water-dispersible pigments or oil-soluble dyes may be dissolved in the monomers prior to polymerization. If desired, preservatives may be added to the emulsion.

Another advantage of this invention relates to the improved adhesion characteristics of the films or coatings deposited from the emulsions. This is especially pronounced with coatings on glass or polished metal or other smooth impervious surfaces, and represents a distinct advantage over other prior art emulsions.

The table illustrates the effect of the variation in the proportions of the ingredients on the viscosity of the resulting polymerized emulsion.

Table 1

| Example | Parts of monomeric methyl acrylate | Parts of peptized casein | Parts of water-soluble alginate | Viscosity | | | |
|---|---|---|---|---|---|---|---|
| | | | | 6 R.P.M. | 12 R.P.M. | 30 R.P.M. | 60 R.P.M. |
| II | 250 | 7.0 | 0.25 | (¹) | 3 | 6 | 8 |
| III | 250 | 7.0 | 0.75 | 40 | 40 | 35 | 32 |
| IV | 250 | 7.0 | 1.25 | 910 | 615 | 370 | 260 |
| V | 250 | 7.0 | 1.75 | 3,500 | 2,250 | 1,200 | 780 |
| VI | 250 | 7.0 | 2.00 | 6,400 | 4,150 | 2,200 | 1,440 |
| I (above) | 250 | 7.0 | 2.50 | 17,000 | 10,800 | 5,800 | 3,750 |
| VII | 250 | 7.0 | 3.50 | 68,000 | 39,000 | 17,280 | (²) |
| VIII | 250 | 3.5 | 0.75 | 80 | 75 | 63 | 57 |
| III (above) | 250 | 7.0 | 0.75 | 40 | 40 | 35 | 32 |
| IX | 250 | 14.0 | 0.75 | 1,900 | 1,350 | 850 | 590 |

¹ Too low to measure.
² Beyond range of instrument.

Example X

Twenty-eight and two-tenths parts of peptized casein, 3.75 parts of water-soluble alginate, and 31.02 parts of a long chain alkyl sulfate were stirred and heated in a flask with 1,410 parts of water until a smooth fluid mixture free of lumps was obtained. To this mixture 250 parts of monomeric methyl acrylate was added, the resulting mixture being polymerized to form a water emulsion having 15 percent by weight of resin content. Viscosities in centipoises as determined by the Brookfield Viscosimeter were: 45 at 6 R. P. M.; 37 at 12 R. P. M.; 24 at 30 R. P. M.; and 21 at 60 R. P. M.

In Table 2, the examples are similar to Example X, except for variation in the resin content.

Table 2

| Example | Percent resin content | Parts of peptized casein | Parts of water-soluble alginate | Viscosity | | | |
|---|---|---|---|---|---|---|---|
| | | | | 6 R.P.M. | 12 R.P.M. | 30 R.P.M. | 60 R.P.M. |
| X (above) | 15.0 | 7.0 | 0.93 | 45 | 37 | 24 | 21 |
| XI | 27.5 | 7.0 | 0.93 | 900 | 650 | 380 | 260 |
| XII | 41.0 | 7.0 | 0.93 | 1,400 | 1,050 | 680 | 500 |

Example I

Seven parts of peptized casein, 2.50 parts of ammonium alginate and 5.0 parts by weight of a long chain alkyl sulfate (emulsifying agent) were stirred and heated in a flask with 350 parts of water until a smooth fluid mixture free of lumps was obtained. To this mixture was added 250 parts of monomeric methyl acrylate with 1.0 parts of dodecyl mercaptan (polymerization regulator). After brief stirring, a smooth, fluid, light tan-colored emulsion was formed. With the addition of 0.3 part of 30% hydrogen peroxide (polymerization catalyst) and heating to 70°–75° C., the polymerization started and, accompanied by gentle reflux, continued for about one hour at which time it was complete. During the polymerization, a gradual thickening process occurred, and the color changed from tan to white. Upon completion, the emulsion was thick, very creamy and very stable. The viscosities in centipoises at room temperature as determined by the Brookfield Viscosimeter at various speeds were: 17,000 at 6 R. P. M.; 10,800 at 12 R. P. M.; 5,800 at 30 R. P. M.; and 3,750 at 60 R. P. M.

In Table 1, the examples are similar to Example I, except for variation in the amounts of the water-soluble alginates and the casein employed.

Various embodiments differing from the above examples are possible. Although the examples employ a peptized casein, and ammonium alginate, other casein and protein preparations and other water-soluble alginate salts may be substituted. Furthermore, various emulsifiers other than those indicated may be used or the emulsifiers may be omitted in case the casein or protein and the alginates have sufficient emulsifying effects. Also, various other polymerizable unsaturated compounds, such as other acrylic acid esters, styrene, vinyl chloride, vinyl esters (in particular vinyl acetate), vinyl ethers, vinylidene chloride, allyl esters, allyl ethers, or a mixture of any of them, may be substituted for the monomeric methyl acrylate.

Having thus described the invention, what is claimed is:

1. A process of producing an aqueous resin emulsion coating composition, comprising agitating an aqueous mixture containing peptized casein, a water-soluble alginate, and a polymerizable unsaturated compound selected from the group consisting of acrylic acid esters, styrene, vinyl chloride, vinyl acetate and vinylidene chloride, in the proportions of 3.5 to 28.2 parts of the casein and 0.25 to 3.75 parts of the alginate per 250 parts of the unsaturated compound and heating the mixture to polymerize the unsaturated compound therein.

2. The process of claim 1 wherein a long-chain alkyl sulfate as an emulsifying agent is also added to the mixture.

3. The process of claim 1 wherein the alginate is ammonium alginate.

4. The process of claim 1 wherein the unsaturated compound is an acrylic acid ester.

5. A coating composition comprising an aqueous emulsion of a polymerized unsaturated compound selected from the group consisting of acrylic acid esters, styrene, vinyl chloride, vinyl acetate and vinylidene chloride, the viscosity of the composition being adjusted by incorporation of peptized casein and a water-soluble alginate therein prior to polymerization, in the proportions of 3.5 to 28.2 parts of the casein and 0.25 to 3.75 parts of the alginate per 250 parts of the unsaturated compound.

6. A coating composition comprising an aqueous emulsion of polymerized monomeric methyl acrylate, the viscosity of the composition being adjusted by incorporation of peptized casein and a water-soluble alginate therein prior to polymerization, in the proportions of 3.5 to 28.2 parts of the casein and 0.25 to 3.75 parts of the alginate per 250 parts of the monomeric methyl acrylate.

WILLIAM C. MAST.

REFERENCES CITED

The following references are of record in the file of this patent:

UNITED STATES PATENTS

| Number | Name | Date |
|---|---|---|
| 1,756,943 | Frankenburger | May 6, 1930 |
| 2,191,520 | Crawford et al. | Feb. 27, 1940 |
| 2,388,600 | Collins | Nov. 6, 1945 |

FOREIGN PATENTS

| Number | Country | Date |
|---|---|---|
| 513,465 | Great Britain | Oct. 13, 1939 |
| 832,347 | France | June 27, 1938 |